No. 749,229. PATENTED JAN. 12, 1904.
E. SERVUSS.
PICTURE FRAME.
APPLICATION FILED APR. 10, 1903.
NO MODEL.

Witnesses:
Emil Kayser
Max Wescher

Inventor
Eugen Servuss
by
Attorney

No. 749,229. Patented January 12, 1904.

UNITED STATES PATENT OFFICE.

EUGEN SERVUSS, OF BERLIN, GERMANY, ASSIGNOR TO ALBERT JUNG, OF BERLIN, GERMANY.

PICTURE-FRAME.

SPECIFICATION forming part of Letters Patent No. 749,229, dated January 12, 1904.

Application filed April 10, 1903. Serial No. 152,046. (No model.)

*To all whom it may concern:*

Be it known that I, EUGEN SERVUSS, a subject of the King of Prussia, German Emperor, and a resident of 6 Antonstrasse, Berlin, in the Kingdom of Prussia, German Empire, have invented certain new and useful Improvements in Picture-Frames, of which the following is an exact specification.

My invention relates to improvements in frames for pictures, photographs, or the like, and more especially to means for easily and quickly fixing the pictures or photographs in the frame. I attain this purpose by the arrangement of several slides, which are shifted over the picture and which can be moved simultaneously.

In order to make my invention more clear, I refer to the accompanying drawings, in which—

Figure 1:
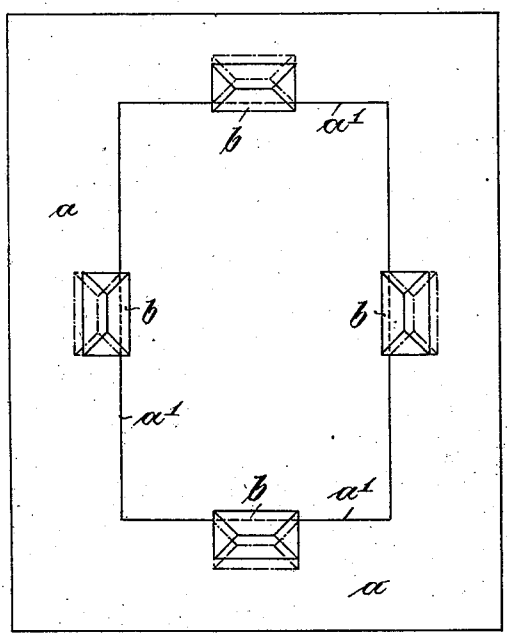
Figure 2:
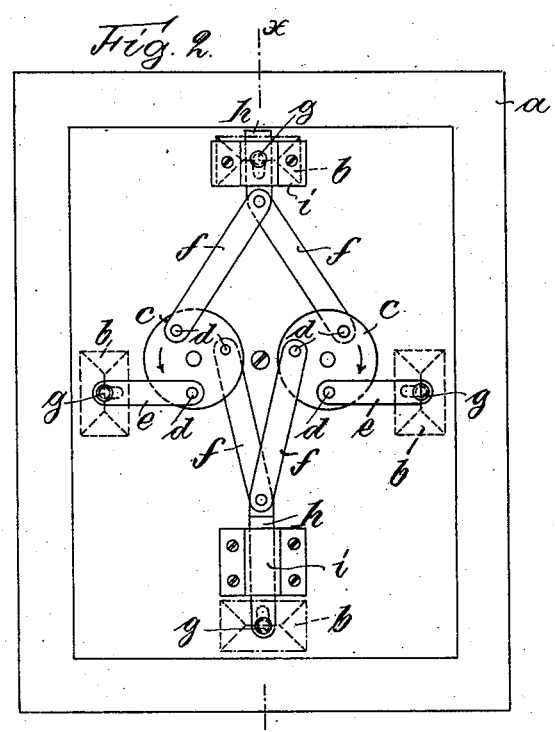

Figure 1 is a front view of my improved frame. Fig. 2 is a back view of the same after the removal of the back plate covering the operating parts, and Fig. 3 is a section on line $x\,x$ of Fig. 2.

In the drawings, $a$ is the frame proper of a rectangular or the like shape. In the example shown four slides $b$ are provided, which be can shifted so that the inner edges project over the edge $a'$ of the frame, as shown in full line in Fig. 1 of the drawings. In this position a picture $k$, Fig 3, situated in the frame, will be held fast by the projecting edges of the slides $b$. The slides $b$ can be moved outside, so as to adopt the position shown in dotted lines in Fig. 1 and in full lines in Fig. 3, in which position the picture can be put in or taken out. The slides $b$ may be of any convenient form and may serve at the same time ornamental purposes.

At the back side $m$ of the frame two turning disks $c$ are provided, each of which carries three pins $d$. One of these pins $d$ of each disk is directly connected by means of the connecting-bars $e$ with the slides $b$, situated at the longitudinal sides of the frame. The other pins $d$ are connected by the connecting-rods $f$ to the slides $b$, situated at the cross sides of the frame $a$. The slides are guided by means of pins $g$ in slots of the frame. The bars $e$ are directly fixed to the pins $g$, while the bars $f$ are fixed to special slides $h$, guided in guide-pieces $i$, which slides $h$ are connected by means of the pins $g$ to the slides $b$.

Figure 3:
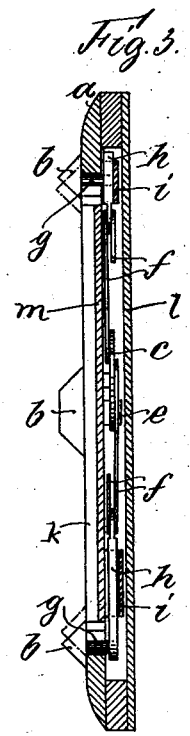

As shown in Fig. 3, the whole mechanism for moving the slides may be covered by means of a plate $l$.

It will be understood that in the construction described above all the slides $b$ are moved simultaneously by moving one of the slides. The construction of the device for moving the slides may be modified in different ways. It will also be clear that any convenient number of slides $b$ may be provided. For small frames only two slides $b$ may be sufficient for holding the picture.

Having now fully described the nature of my invention, what I desire to secure by Letters Patent of the United States is—

1. In picture-frames, the combination of a frame proper, with movable slides situated at the front side of the same and capable of being shifted so as to project over the inner edge of the frame, with means for simultaneously moving the slides, said means being situated on the back side of the frame, substantially as described and for the purpose set forth.

2. In picture-frames, the combination of the frame proper, with movable slides situated at the front side of the frame, with a turnable disk situated on the back side of the frame, and means for connecting the slides with said disk, substantially as described and for the purpose set forth.

3. In picture-frames, the combination of a frame proper, with movable slides situated at the front side of the same and capable of being shifted so as to project over the inner edge of the frame, turnable disks situated at the back side of the frame and provided with pins, and means for connecting these pins to the slide mentioned above, substantially as described and for the purpose set forth.

In testimony whereof I have signed my name to this specification in the presence of two subscribing witnesses.

EUGEN SERVUSS.

Witnesses:
   HENRY HASPER,
   WOLDEMAR HAUPT.